United States Patent [19]
Fletcher et al.

[11] Patent Number: 6,108,782
[45] Date of Patent: Aug. 22, 2000

[54] DISTRIBUTED REMOTE MONITORING (DRMON) FOR NETWORKS

[75] Inventors: Rick Fletcher, San Jose; Prakash Banthia, Santa Clara, both of Calif.

[73] Assignee: 3COM Corporation, Santa Clara, Calif.

[21] Appl. No.: 08/882,207

[22] Filed: Jun. 24, 1997

Related U.S. Application Data

[63] Continuation-in-part of application No. 08/766,274, Dec. 13, 1996, abandoned.
[60] Provisional application No. 60/040,876, Mar. 21, 1997, abandoned.

[51] Int. Cl.[7] ............................... H04L 9/00; G06F 11/30
[52] U.S. Cl. ..................... 713/153; 713/201; 713/202; 709/224; 709/235; 370/245; 370/252
[58] Field of Search ................................... 709/224, 235, 709/227, 230, 248; 370/252, 241, 245; 713/201, 202, 151, 153, 160, 162

[56] References Cited

U.S. PATENT DOCUMENTS

| | | | |
|---|---|---|---|
| 4,817,080 | 3/1989 | Soha | 370/252 |
| 5,251,152 | 10/1993 | Notess | 709/224 |
| 5,450,601 | 9/1995 | Okuda | 709/224 |
| 5,781,703 | 7/1998 | Desai et al. | 706/50 |
| 5,961,596 | 10/1999 | Takubo et al. | 709/224 |

FOREIGN PATENT DOCUMENTS

| | | |
|---|---|---|
| 0 573 248 A1 | 12/1993 | European Pat. Off. . |
| 0 726 664 A2 | 8/1996 | European Pat. Off. . |
| WO 96/38955 | 12/1996 | WIPO . |

OTHER PUBLICATIONS

Greenfield, "Network Management Filters Down to the Desktop," Data Communications, vol. 20, No. 13, Sep. 1991, pp. 39, 40, 42.

Jander, "Midlevel Managers Ease SNMP Information Overload," Data Communications, vol. 22, No. 17, Nov. 1993, pp. 53, 54, 56, 58.

Jander, "Lightening the Load on Management Stations," Data Communications, vol. 23, No. 9, Jun. 1994, pp. 45, 46.

Johnson, "A three–Layered Solution for Managing the Enterprise," Data Communications, vol. 24, No. 8, Jun. 1995, pp. 41, 42.

Larsen, "Mastering Distributed Domains via the Web," Data Communications, vol. 25, No. 7, May 1996, pp. 36, 38.

Lee, "A Distributed Network Management System," Proceedings of the Global Telecommunications Conference, San Francisco, CA, Nov. 28–Dec. 2, 2994, vol. 1, Nov. 1994, Institute of Electronics Engineers, pp. 548–552.

Roberts, "RMON Adapters Shed Light on LAN's," Data Communications, vol. 25, No. 6, May, 1996, pp. 43, 44.

Schwager, "Remote Network Monitoring MIB," Annual Review of Communications, National Engineering Consortium, Chicago, IL, vol. 46, Jan. 1992, pp. 752–754.

Stallings, "Patching the Cracks in SNMP," Byte, vol. 21, No. 8, Aug. 1996, pp. 55–56.

*Primary Examiner*—Gilberto Barron, Jr.
*Attorney, Agent, or Firm*—Wagner Murabito & Hao LLP

[57] ABSTRACT

Distributed remote monitoring (dRMON) of network traffic and performance uses distributed nodes to collect traffic statistics at distributed points in the network. These statistics are forwarded to collectors which compile the statistics to create combined views of network performance. A collector may mimic a prior art, non-distributed, network probe and may interact with network management software as though it were a stand alone network probe thereby simplifying a user's interaction with the distributed system. The invention is designed to work in accordance with a variety of standard network management protocols including SNMP, RMON, and RMON2 but is not limited to those environments. The invention has applications in a variety of communication system environments including local area networks, cable television distribution systems, ATM systems, and advanced telephony systems. A specific embodiment of the invention solves is particularly optimized to work in LAN environments with end systems running under Windows-compatible network operating systems.

26 Claims, 6 Drawing Sheets

| LAYER NAME (NUMBER) | DTA STACK | DATA | PROTOCOLS |
|---|---|---|---|
| HIGHER LAYER PROTOCOLS | | | |
| APPLICATION (7) | Manager App | Protocol Packets/MIBs | SNMP, FTP, HTTP |
| PRESENTATION (6) | | | Data Encryption/ Compression |
| SESSION (5) | | SESSIONS | FULL/HALF DUPLEX |
| TRANSPORT (4) | | PACKET STREAM | TCP, UDP |
| NETWORK (3) | DTA DRIVER | ROUTING PACKETS | IP |
| DATA LINK (2) | NIC (DTA DRIVER) | PACKETS | ETHERNET |
| PHYSICAL (0,1) | ADAPTOR | BITS | ETHERNET | data file: timer.txt ipcount "0020AF6354D876"
pktdist 117.38 77.78 12.98 58.78 6.24 86.84
pktrate 0.00 0.00 0.00 0.00 0.00 0.00 88.00 80.00 83.00
stats 29.00 0.00 0.00 37.00 0.00 0.00 27.00 0.00 0.00 33.00 0.00 0.00 49.00 0.00 0.00 41.00 0.00 0.00 46.00 0.00 0.00 31.00 0.00 0.00 35.00 0.00 0.00 34.00 0.00 0.00 30.00 0.00 0.00 36.00 0.00 0.00 21.00 0.00 0.00 32.00 0.00 0.00 47.00 0.00 0.00 39.00 0.00 0.00 42.00 0.00 0.00 43.00 0.00 0.00
43.00 0.00 0.00 38.00 0.00 0.00
top10 "0800020a90e5" 16.25 "080007045a11" 6.88 "00c04fd065af" 1.78 "00c04fd06545" 1.70 "00c04fd073ba" 1.52 "00c04fd07790" 1.50 "00c04fd0G511" 1.25 "0020afd00bb5" 0.72 "00a024baf727" 0.52 "00c04fd93097" 0.52
fromtop1 "ffffffffffff" 16242.00 "0020af9d94b3" 1265.00 "00c04fcd346a" 522.00 "090007ffffff" 331.00 "00a02418a870" 131.00 "00c04fc3e24c" 93.00 "0020afd00bb5" 80.00 "0020af2ff5cd" 57.00 "0900070000bl" 25.00 "0020af6354d8" 23.00
totop1 "0020af9d94b3" 1204.00 "00c04fcd346a" 581.00 "00a02418a870" 124.00 "00c04fc3e24c" 89.00 "0020afd00bb5" 74.00 "0020af2ff5cd" 44.00 "0020af6354d8" 11.00 "0020af236lc2" 7.00
fromtop2 "ffffffffffff" 1111.00
fromtop3 "ffffffffffff" 4229.00
totop3 "0020af6354d8" 2.00 "0020af2ff5cd" 2.00
fromtop4 "ffffffffffff" 4209.00
totop4 "0020af6354d8" 2.00 "0020af2ff5cd" 2.00
fromtop5 "ffffffffffff" 2208.00
totop5 "0020af6354d8" 2.00 "0020af2ff5cd" 2.00
fromtop6 "ffffffffffff" 4323.00
totop6 "0020af6354d8" 2.00 "0020af2ff5cd" 2.00
fromtop7 "ffffffffffff" 370.00
totop7 "0020af6354d8" 6.00 "0020af2ff5cd" 6.00
topl0err
util 0.05 0.08 0.04 0.07 0.07 0.06 0.09 0.04 0.07 0.06 0.05 0.08 0.03 0.09 0.07 0.05 0.08 0.05 0.09 0.07

*FIG. 10*

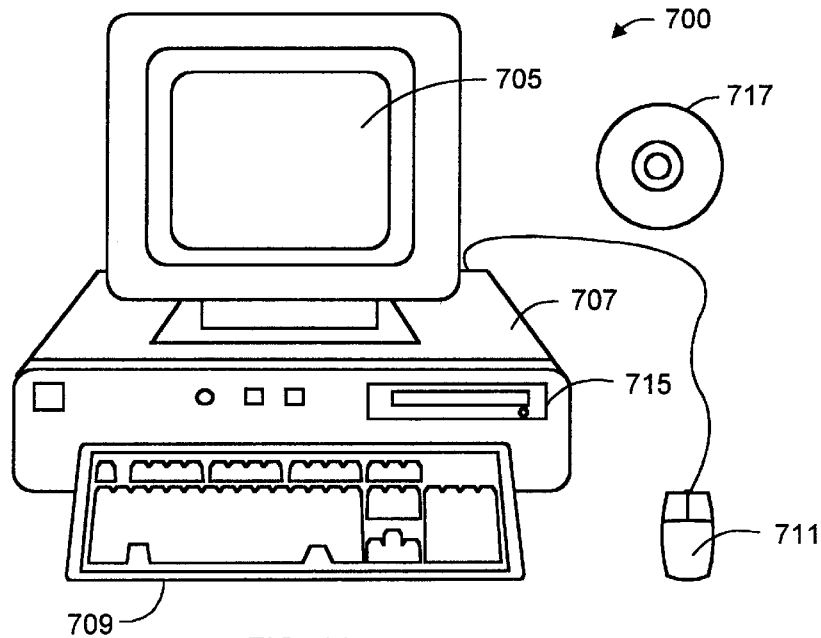

*FIG. 11*

DISTRIBUTED REMOTE MONITORING (DRMON) FOR NETWORKS

This application claims priority from provisional patent application 60/040,876, filed Mar. 21, 1997 now expired abandoned. This application is a continuation-in-part of Ser. No. 08/766,274LE A1EU ( )757 Pk2-D15 306-3101, filed Dec. 13, 1996 now abandoned.

MICROFICHE APPENDIX

This application has been filed with a microfiche appendix containing a user manual relating to one specific embodiment of a system incorporating aspects of the invention. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to transmission of information between multiple digital devices on a network. More particularly, this invention relates to a method and apparatus for monitoring and analysis of network traffic using a distributed remote traffic monitoring (DRMON) technology.

Related technology is discussed in co-assigned co-pending U.S. patent applications Ser. Nos. 08/506,533, entitled METHOD AND APPARATUS FOR ASYNCHRONOUS PPP AND SYNCHRONOUS PPP CONVERSION, filed Jul. 25, 1995 now U.S. Pat. No. 5,666,362; and 08/542,157, entitled METHOD AND APPARATUS FOR TRANSPARENT INTERMEDIATE SYSTEM BASED FILTERING ON A LAN OF MULTICAST PACKETS, filed Oct. 12, 1995 now U.S. Pat. No. 5,818,838 and incorporated herein by reference to the extent necessary to understand the invention.

Networking Devices Standards

This specification presumes familiarity with the general concepts, protocols, and devices currently used in LAN networking applications and in WAN internetworking applications. These standards are publicly available and discussed in more detail in the above referenced and other co-assigned patent applications.

This specification also presumes some familiarity with the specific network and operating system components discussed briefly in the following paragraphs, such as the simple network management protocol (SNMP) for management of LAN and WAN networks, and the RMON MIBs defined for remote network monitoring and management.

General Network Topology

FIG. 1 illustrates a local area network (LAN) 40 of a type that might be used today in a moderate sized enterprise as an example of a network in which the present invention may be deployed. LANs are arrangements of various hardware and software elements that operate together to allow a number of digital devices to exchange data within the LAN and also may include internet connections to external wide area networks (WANs) such as WANs 42 and 44. Typical modern LANs such as 40 are comprised of one to many LAN intermediate systems such as 60–63 that are responsible for data transmission throughout the LAN and a number of end systems (ESs) such as ESs 50a–d, 51a–c, and 52a–g, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN intermediate systems (IS) 60–63 are referred to as bridges or switches or hubs and WAN ISs 64 and 66 are referred to as routers, however many different LAN configurations are possible, and the invention is not limited in application to the network shown in FIG. 1.

Packets

In a LAN such as 40, data is generally transmitted between ESs as independent packets, with each packet containing a header having at least a destination address specifying an ultimate destination and generally also having a source address and other transmission information such as transmission priority. Packets are generally formatted according to a particular protocol and contain a protocol identifier of that protocol. Packets may be encased in other packets. FIG. 2 illustrates a packet.

Layers

Modern communication standards, such as the TCP/IP Suite and the IEEE 802 standards, organize the tasks necessary for data communication into layers. At different layers, data is viewed and organized differently, different protocols are followed, different packets are defined and different physical devices and software modules handle the data traffic. FIG. 3 illustrates one example of a layered network standard having a number of layers, which we will refer to herein as: the Physical Layer, the Data Link Layer, the Routing Layer, the Transport Layer, the Session Layer, the Presentation Layer and the Application Layer. These layers correspond roughly to the layers as defined within the TCP/IP Suite. (The 802 standard and other standards have different organizational structures for the layers.)

Generally, when an ES is communicating over a network using a layered protocol, a different software module may be running on the ES at each of the different layers in order to handle network functions at that layer. Examples of software modules existing within an ES at different layers are shown in FIG. 3.

Drivers and Adapters

Each of the ISs and ESs in FIG. 1 includes one or more adapters and a set of drivers. An adaptor generally includes circuitry and connectors for communication over a segment and translates data from the digital form used by the computer circuitry in the IS or ES into a form that may be transmitted over the segment, which may be electrical signals, optical signals, radio waves, etc. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

NIC Driver

The lowest layer adaptor software operating in one type of network ES is generally referred to as a NIC (Network Interface Card) driver. A NIC driver is layer 2 software designed to be tightly coupled to and integrated with the adaptor hardware at the adaptor interface (layer 1) and is also designed to provide a standardized interface between layer 2 and 3. Ideally, NIC drivers are small and are designed so that even in an ES with a large amount of installed network software, new adaptor hardware can be substituted with a new NIC driver, and all other ES software can continue to access the network without modification.

NIC drivers communicate through one of several available NIC driver interfaces to higher layer network protocols.

Examples of NIC driver interface specifications are NDIS (Network Driver Interface Specification developed by Microsoft and 3Com) and ODI (Open Data-Link Interface developed by Apple Computer and Novell).

Generally, when an ES is booting up and begins building its stack of network protocol software, the NIC driver loads first and tends to be more robust than other network software modules because of its limited functions and because it is tightly designed to work with a particular hardware adaptor.

Management and Monitoring of Individual ESs in a Network Environment

A network such as that shown in FIG. 1 is generally managed and monitored within an enterprise by a central Information Services department (ISD), which is responsible for handling all the interconnections and devices shown. The same ISD is generally responsible for managing the applications and system components on each of the individual ESs in the network.

Many prior art systems have been proposed to allow an IS staff person to manage and partially monitor network infrastructure remotely over a network. Such systems include IBM's NetView, HP's OpenView or Novell's Network Management System (NMS). However, these systems generally rely on a full network protocol stack to be correctly running effectively on the remote ES in order to accomplish any remote file management operations.

Simple Network Management Protocol (SNMP)

A common protocol used for managing network infrastructure over the network is the Simple Network Management Protocol (SNMP). SNMP is a layer 7 network and system management protocol that handles network and system management functions and can be implemented as a driver (or SNMP agent) interfacing through UDP or some other layer 4 protocol. Prior art SNMP installations largely were not placed in ESs because SNMP did not handle ES management or monitoring functions and because SNMP agents are processor and memory intensive.

SNMP is designed to provide a simple but powerful cross platform protocol for communicating complex data structures important to network infrastructure management. However, its power and platform-independent design makes it computationally intensive to implement, and for that reason it has limited applications in end system management or monitoring. It is primarily used in network infrastructure management, such as management of network routers and bridges.

SNMP is designed to support the exchange of Management Information Base (MIB) objects through use of two simple verbs, get and set. MIB objects can be control structures, such as a retry counter in an adaptor. Get can get the current value of the MIB and set can change it. While the SNMP protocol is simple, the MIB definitions can be difficult to implement because MIB ids use complex data structures which create cross-platform complexities. SNMP has to translate these complex MIB definitions into ASN.1 which is a cross-platform language.

Even if installed in an ES, an SNMP agent cannot be used to manage or diagnose an ES or update system components where the UDP protocol stack is not working properly, which will often be the case when the network connection is failing. When working, SNMP provides a protocol interface for higher layer prior art management applications.

SNMP is described in detail in a number of standard reference works. The wide adoption of SNMP throughout the networking industry has made compatibility with SNMP an important aspect of new management and monitoring tools.

Prior Art RMON Overview

Prior art Remote Monitoring (RMON) technology is a set of software and hardware specifications designed to facilitate the monitoring and reporting of data traffic statistics in a local area network (LAN) or wide area network (WAN). RMON was originally defined by the IETF (Internet Engineering Task Force) in 1991. RMON defined an independent network probe, which was generally implemented as a separate CPU-based system residing on the monitored network. Software running on the probe and associated machines provided the various functions described by the defining IETF RFC documents, RFC-1271, RFC-1513 and RFC-1757.

According to the original standards, a special application program, sometimes referred to as an RMON Manager, controlled the operation of the probe and collected the statistics and data captured by the probe. In order to track network traffic and perform commands issued to it by the RMON Manager, a prior art probe operated in a promiscuous mode, where it read every packet transmitted on network segments to which it was connected. The probe performed analyses or stored packets as requested by the RMON Manager.

Prior art RMON builds upon the earlier Simple Network Management Protocol (SNMP) technology while offering four advantages over SNMP agent-based solutions:

(1) RMON provides autonomous Network Management/Monitoring, unlike SNMP which required periodic polling of ESs. RMON stand-alone probes are constantly on duty and only require communication with a management application when a user wishes to access information kept at the probe.

(2) RMON's alarm capability and user-programmable event triggers furnish a user with asynchronous notification of network events without polling ESs. This reduces the network bandwidth used and allows across-WAN links without concern for performance costs.

(3) RMON automatically tracks network traffic volume and errors for each ES MAC address seen on a segment and maintains a Host Matrix table of MAC address pairs that have exchanged packets and the traffic volume and errors associated with those address pairs.

(4) RMON permits the collection and maintenance of historical network performance metrics thereby facilitating trend analysis and proactive performance monitoring.

(5) RMON includes fairly sophisticated packet filter and capture capabilities which allowed a user to collect important network packet exchanges and analyze them at the management console.

The new capabilities of RMON were quickly appreciated and RMON probes soon became the preferred choice for remote monitoring. It has become common place for ISs, particularly hubs and switch/bridges to embed RMON probe functions.

RMON2

Shortly after adoption of RMON, users wanted more management information than the layer 2 statistics RMON provided. In particular, network managers wanted to track higher layer protocols and the sessions based upon those protocols to learn which applications were using which protocols at what expense in available network bandwidth. Therefore, a new version of RMON, RMON2 was developed to provide more advanced capabilities. RMON2 provides network header layer (layer 3) through application layer (layer 7) monitoring for a number of commonly used protocols and applications, including the Internet protocol suite (IP and UDP) and Internet applications (FTP, Telnet, TCP and SNMP).

Limitations of IS-Based (Hub-Based/Switch-Based RMON

A traditional stand-alone RMON probe, connected to a switch like any other host device, only sees network traffic flowing on the segments to which it is connected, greatly limiting its usefulness in modern, more complicated network topologies. One solution is to place the RMON probe within the switch itself and have it monitor all ports simultaneously. However, this requires considerable processing capability in order to handle the large bandwidth made possible by modern switching architectures.

In a conventional 10 Mb Ethernet or 4/16 Mb Token Ring environment, a stand-alone RMON probe on a single network segment could usually be implemented on a 486-class processor. However, where multiple network interfaces must be monitored or where network bandwidths are higher, (such as with 100Base-T LANs or switching hubs/ATM), it is considerably more costly to build a probe with sufficient processing power to capture all, or even most, of the network packets being exchanged. Independent laboratory tests show that RMON products claiming to keep up with higher bandwidth network traffic generally cannot, in fact, keep up with all data flow during peak network rates. The situation worsens considerably when attempting to do RMON2 analysis of network packets in high bandwidth environments. Processing power required can be easily five times greater than needed to simply capture packets, and data storage requirements can easily increase ten fold.

Use of filtering switches and hubs (discussed in the above referenced patent applications) in networks further limits the usefulness of probes because, unlike repeaters, not all the packets appear at every output port of the switch. This makes the use of external stand-alone probes infeasible unless the switch vendor has provided a monitor port (sometimes called a copy port) where all packets are repeated to the external RMON probe. However, this approach decreases data traffic performance in the switch, and does nothing to reduce the processing overhead required of the probe.

In general, what is needed is an efficient and workable mechanism for the distributed collection of performance statistics in a communication system. Within the specific environment just described, what is needed is an RMON technology whereby RMON functionality can be implemented in a LAN/WAN without unduly harming network performance and not requiring additional expensive network hardware to support. Ideally, this technology would be compatible with standard RMON and RMON2 technology so it could operate effectively with existing network management software.

For purposes of clarity, the present discussion refers to network devices and concepts in terms of specific examples. However, the method and apparatus of the present invention may operate with a wide variety of types of network devices including networks and communication systems dramatically different from the specific examples illustrated in FIG. 1 and described below. It should be understood that while the invention is described in terms of a computer network, the invention has applications in a variety of communication systems, such as advanced cable television systems, advanced telephone networks, ATM, or any other communication system that would benefit from distributed performance monitoring and centralized collection and compilation. It is therefore not intended that invention be limited, except as indicated by the appended claims. It is intended that the word "network" as used in the specification and claims be read to cover any communication system unless the context requires otherwise and likewise "end system" and "node" be read to encompass any suitable end system (telephone, television) on any such communication system or to encompass distributed points in the network intermediate of an end systems. It is also intended that the word "packet" as used in the specification and claims be read to cover any unit of transmitted data, whether an ethernet packet, a cell, or any other data unit transmitted on a network unless the context requires otherwise.

SUMMARY OF THE INVENTION

The present invention is a method and apparatus for distributed remote network monitor (dRMON) in a LAN. According to an embodiment of the invention, dRMON agents, which are software or software plus hardware components, are placed within each (or a subset) of the ESs such as 50a–c, 51a–c, and 521-g, connected to the LAN or within server machines. These agents implement prior art RMON functional groups but only capture and analyze packets that their native ES sends or receives, or in some embodiments captures packets that the ES communicates with an ES that does not have an dRMON agents installed; as a result, the processing requirements of the dRMON agents are kept well within the range of the ES (or host) CPU's capabilities and generally do not result in a noticeable loss of performance.

According to the invention, on a periodic basis, initiated by a polling packet from the collector in one embodiment, the dRMON agents forward their statistics and/or captured packets to a dRMON collector (referred to as a proxy in some of the previously referenced applications because it can act as a proxy for, or mimic, the behavior of a prior art dRMON probe), existing somewhere on the WAN/LAN. The collector combines received agent data thereby creating at the collector the view that a prior-art stand-alone RMON probe would have if all the ESs were on the same LAN segment with the probe. According to the invention, the collector may be a stand-alone device connected to the LAN, such as 61b or 65a, or may be implemented within a switch in the LAN such as 62 or within a server, such as 64.

According to one embodiment of the invention, a dRMON collector can mimic the SNMP responses of a prior art non-distributed RMON probe so that existing network management or monitoring software can interact with the collector as though the collector were a prior art probe. Therefore prior art network management software need not be aware of the existence of the dRMON agents.

According to a further embodiment, multicast domains are handled specially. In a default mode, ESs in the same multicast domain are treated by a collector as though they are on one LAN segment. This approach allows other vendor's RMON network management applications to interact with the collector as though it were a prior art probe; however, when used with enhanced dRMON Managers, a user is provided the ability to combine ports and hosts in order to create Virtual LAN (VLAN) definitions which would cause the monitoring function to behave as though all selected hosts were on the same LAN segment being served by the same RMON probe. A dRMON collector in this embodiment could create and maintain several such views with each appearing as one interface to conventional RMON Management applications.

According to a further embodiment, agent proxies are provided to be placed in IS systems such as bridges to handle the dRMON agent functions for ESs that do not have agents. These proxies can be used in environments where some ESs are running operating systems for which dRMON agents are not yet available. According to the invention, using a proxy agent in an IS for just some of the ESs can allow that IS to collect just those statistics needed for agent-less ESs and therefore does not overburden the IS processing capabilities.

There are several key advantages to various embodiments of the invention when compared to other solutions. among these advantages are scalability, affordability, true end-to-end response time monitoring, redundancy, visibility into client node, distributed architecture, and web support.

Because each agent is analyzing only its own directed traffic, or possibly its own traffic and the traffic of a limited number of other ESs, dRMON can handle extremely high bandwidth environments with relative ease. Compared to stand-alone probes, dRMON is more affordable as a remote monitoring tool, particularly in switched environments. Very inexpensive PC technology can be used to host the Collector software resulting in low equipment costs.

RMON2, for all its power, still does not afford the network manager one of the most asked for features, that being continual response time monitoring. RMON2 applications can only do this if packet capture is used to forward the protocol streams to the management station, at a price in network utilization and performance. dRMON Agents routinely perform this analysis and forward the results (not the entire packets) to the Collector.

The fact that dRMON agents in the ESs themselves are collecting the data additionally creates a more precise view of the LAN since any LAN's characteristics vary based upon where in the wire a node is connected; furthermore, because of their cost, probes are often located close to the backbone where fewer probes can see more of the traffic. This approach prevents the network manager from spotting infrastructure problems and delays occurring between the probe's location and the desktop. Only dRMON can perform true, accurate, end-to-end response time analysis.

Since data collection is done by the managed nodes and RMON Collectors can substitute for each other, there is no single point-of-failure and dRMON therefore inherently provides monitoring redundancy. In the case of monolithic probes or management add-in cards, unless multiple probes are deployed on each LAN segment, a probe's failure can be disastrous when attempting remote monitoring.

Because the dRMON agent software of the invention resides in ESs, it can capitalize upon native operating system interface mechanisms (for example OS APIs such as Microsoft's WIN32) to gather information about the ES that could never be ascertained from the wire via packet capture and analysis. Examples of the kinds of information available: (1) Network protocol stack configurations and NIC configurations including problematic situations; (2) Application information such as what protocols an application is bound to, the application's manufacturer, version, file date and time, DLLs used and their versions, etc.; (3) ES system information such as memory, CPU, disk space, current resource utilizations, etc.; and (4) System performance metrics.

The invention will be further understood upon review of the following detailed description in conjunction with the drawings.

BRIEF DESCRIPTION OF THE DRAWINGS

FIG. 10 shows a particular embodiment of a simplified file that may be used to communicate network statistics data to a remote terminal.

FIG. 11 is a diagram of a computer system as an example of a system used to deploy the invention.

DESCRIPTION OF SPECIFIC EMBODIMENTS

Figure 1:
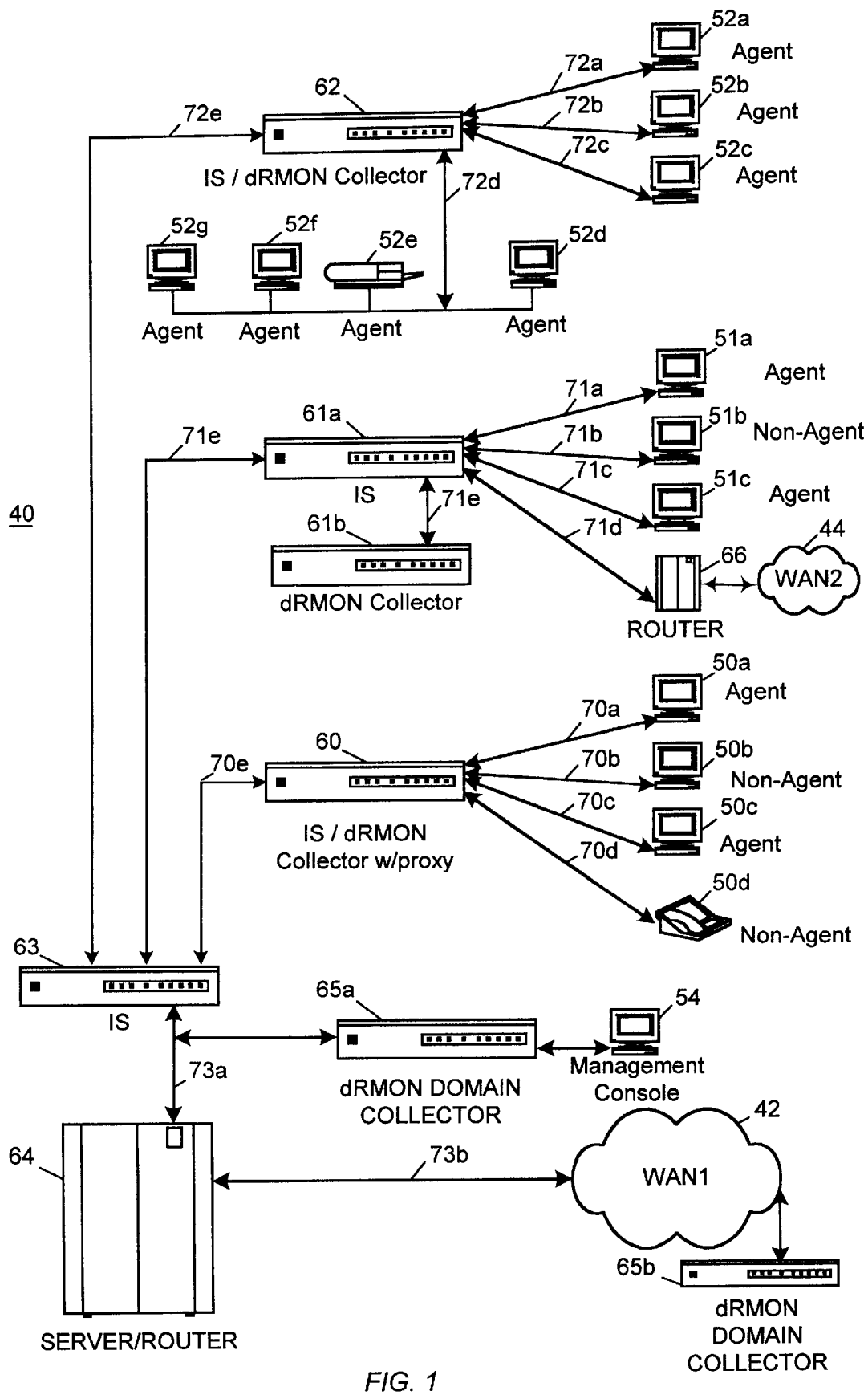
FIG. 1 is a diagram of a local area network of one type in which the invention may be effectively employed.
Figures 2, 3:
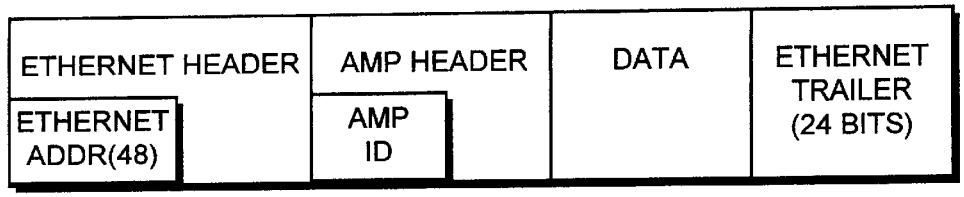
FIG. 2 is a diagram of a packet.
FIG. 3 is a diagram showing a layered network protocol.

FIG. 1 is a block diagram illustrating the deployment of the invention in an example network according to a specific embodiment of the invention. The invention includes two types of primary components, the agents that reside in ESs and the collector or collectors that collect and compile the network statistics and interacts with network management applications (such as an application running on console 54) to provide a management/monitoring picture to the network.

dRMON Agent

In one embodiment, the dRMON agent is implemented in the C programming language. The agent executable code is launched each time an ES is started or rebooted and the agent may be tightly bound to ES adaptor driver software. Because the dRMON agent has no visible ES user interface, the ES user is unaware of the agent's presence, and can do nothing with regards to reconfiguring the ES that would inadvertently disable the agent.

Figure 4:
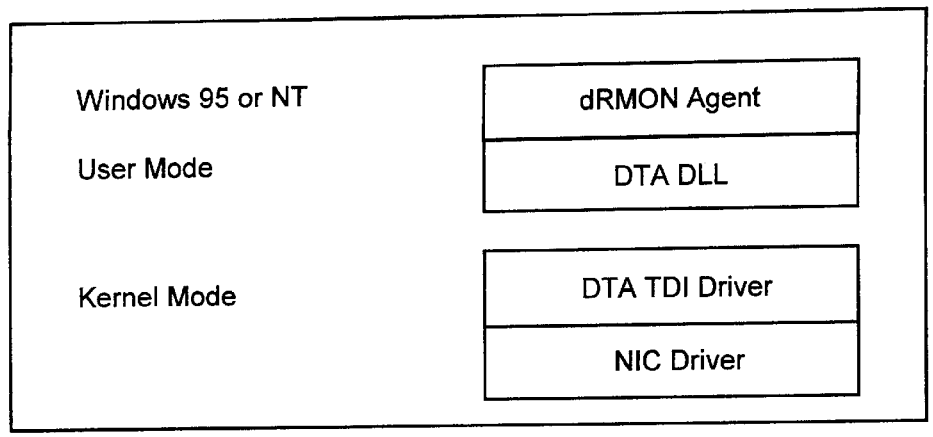
FIG. 4 is a diagram of a particular embodiment of an agent according to the invention and other components upon which it depends.

FIG. 4 shows one particular embodiment of an agent and other components upon which it depends. An NDIS DeskTop Agent type module (DTA) is used to bind to the network adapter driver, thus establishing a source of directed packets to analyze as well as a means to communicate with the dRMON collector via the network. Multiple NIC bindings may be supported by the agent and may allow the agent to monitoring traffic on different segments having different layer 1 protocols.

Among the important functions that can be performed by agents according to various embodiments of the invention are: (1) receiving and responding to messages from the collector and configuring its operation to conform to collector instructions; (2) performing RMON analysis and compiling statistics regarding network traffic for forwarding to the collector; (3) performing packet capture at the agent for forwarding packet streams to the collector, and (4) providing a mechanism for receiving and executing downloadable modules.

Figure 5:
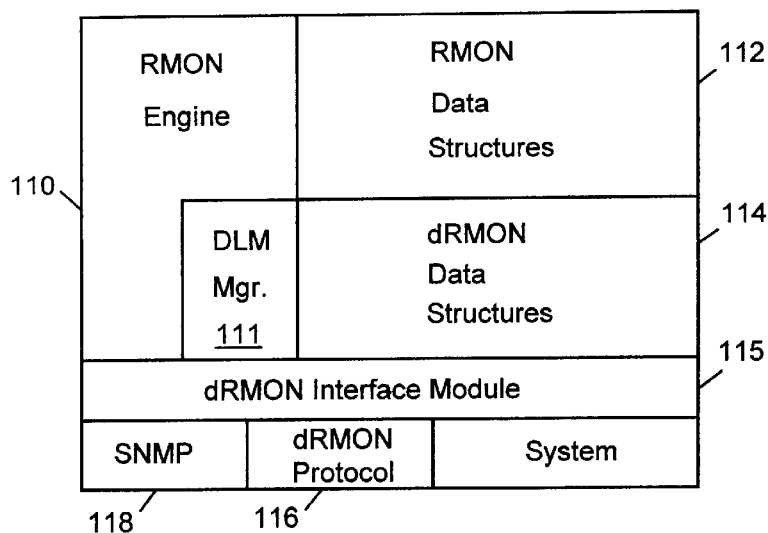
FIG. 5 is a more detailed diagram of a particular embodiment of an agent according to the invention and other components upon which it depends.

FIG. 5 provides an exploded view of the dRMON Agent's internal components. Central to the agent's functionality is RMON Engine 110. This module takes the packet stream received from the network via the DTA and subjects it to RMON analyses as configured via the collector. Data structures and tables are built and maintained within the section labeled RMON Data Structures 112 in order to accomplish and store the results of this RMON analysis. The agent compares packets to filters in effect that have been set by the collector and, upon a match, an event is generated for analysis and/or the packet is retained and added to a capture channel. The invention may include support for Down- Loadable-Modules (DLMs) through DLM manager 111. This allows the user to download executables such as diagnostics from the RMON management console that can perform system analysis, network analysis or both. dRMON data structures 114 are used to store information necessary for agent-to-collector functioning according to the invention, such as, in one embodiment, a list at the agent of the layer 2 (MAC) addresses of all other ES that include functioning dRMON agents.

The dRMON Interface Module 115 is intended to isolate the Agent core from ES platform and network protocol dependencies to maximize the portability of the agent executable code and therefore to facilitate the porting of the agent software to other operating system (OS) platforms.

Below dRMON Interface Module 115 are the lower layer components used to communicate with the dRMON collector, the DTA and the operating system. dRMON protocol box 116 is where the dRMON protocol and DTA interfaces are realized. While dRMON protocol is used for communication with the Collector, many requests coming from the Collector, such as requests to set filtering or packet capture parameters, are essentially SNMP protocol data units (i.e. PDUs or packets) encapsulated in dRMON protocol; hence, the presence of the SNMP interface and decoder module 118, which decodes the necessary subset of SNMP.

In an alternate embodiment, the invention could use a different (possibly routable) protocol instead of dRMON protocol for Agent-to-Collector exchanges. The dRMON Interface Module provides for this by isolating the protocol details from the Agent's core.

dRMON Collector

The dRMON Collector receives RMON analysis and capture data from the agents and sorts, collates, and aggregates that information into a cohesive database that recreates the view a prior art RMON probe would have if the ESs were all on the same LAN segment with the prior art probe. The collector can then makes this information available to management applications, either using SNMP and the MIB-II and RMON MIBs or optionally, to WEB browsers via HTTP or other web interface language. Different instances of the Collector, like the Agent, can be developed to support a number of different operating systems.

Any SNMP operation on the network which would affect the configuration or operation of a stand-alone RMON probe is captured by the collector and forwarded, as appropriate, to the agents so that the agents can modify their behavior accordingly. An example would be an SNMP packet setting filter definitions for which packets flowing on the network are captured for later analysis. Such a packet would be received by the collector and then passed along to dRMON agents which would each individually compare received packets to the filter definitions.

While the invention may be most easily described as a network having a single collector, because the actual data gathering and monitoring is being performed at the managed ESs, it is possible to have another collector on the LAN/WAN assume the data collection duties of a defective or off-line collector. It is also possible to have multiple collectors on a LAN, in which case in this embodiment an identifier is used so that an agent communicates with only one collector. In one embodiment, this identifier also acts as a security password as described below.

Figure 6:
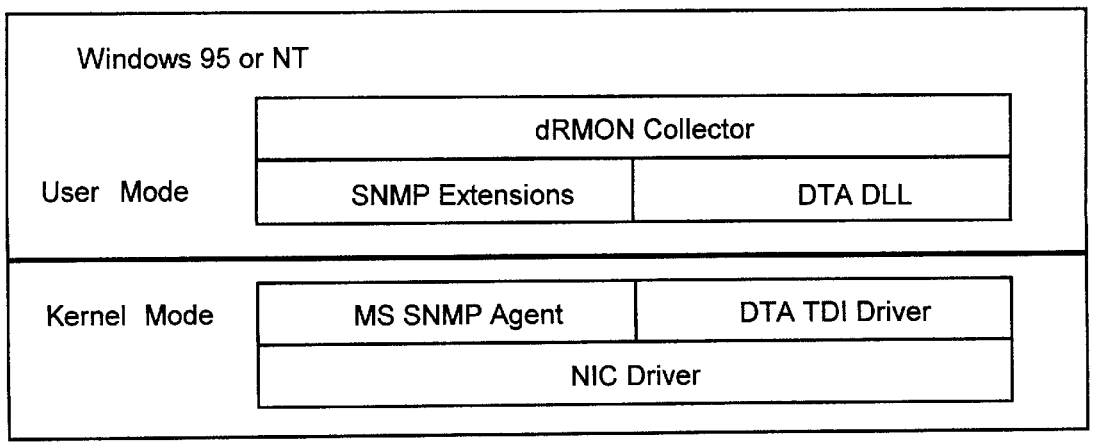
FIG. 6 is a block diagram of an embodiment of a dRMON Collector according to the invention.

FIG. 6 is a block diagram of an embodiment of a dRMON Collector according to the invention. Like the Agent, the Collector loads automatically when the system starts and depends upon the same DTA services to exchange dRMON protocol traffic with its Agents. The DTA is also used as a packet interface to allow the Collector to monitor its own directed traffic as well as the broadcast and multicast traffic flowing within its sphere of management. To prevent duplication of statistics, only the Collector maintains RMON information on broadcast and multicast traffic.

Since, in one embodiment, the Collector must communicate with RMON Manager applications using SNMP, a full set of SNMP interfaces and services 142 exists in the Collector which is not found in the dRMON Agent. In the Windows95(TM) and WindowsNT(TM) environments, Microsoft(TM) offers an extensible SNMP agent. This agent provides the UDP/IP protocol stack, PDU parser and basic MIB-II support, but allows a user-provided extension to register MIB objects that are to be maintained by the user-provided extension. When the extensible agent receives an SNMP PDU referencing one or more of the user-registered objects, it passes the request to a user-provided callback function for processing. In one embodiment, a collector according to the invention registers the full RMON MIB with the Extensible Agent. In embedded applications (e.g., switches), the Microsoft Extensible Agent may be replaced with customized SNMP services.

Figure 7:
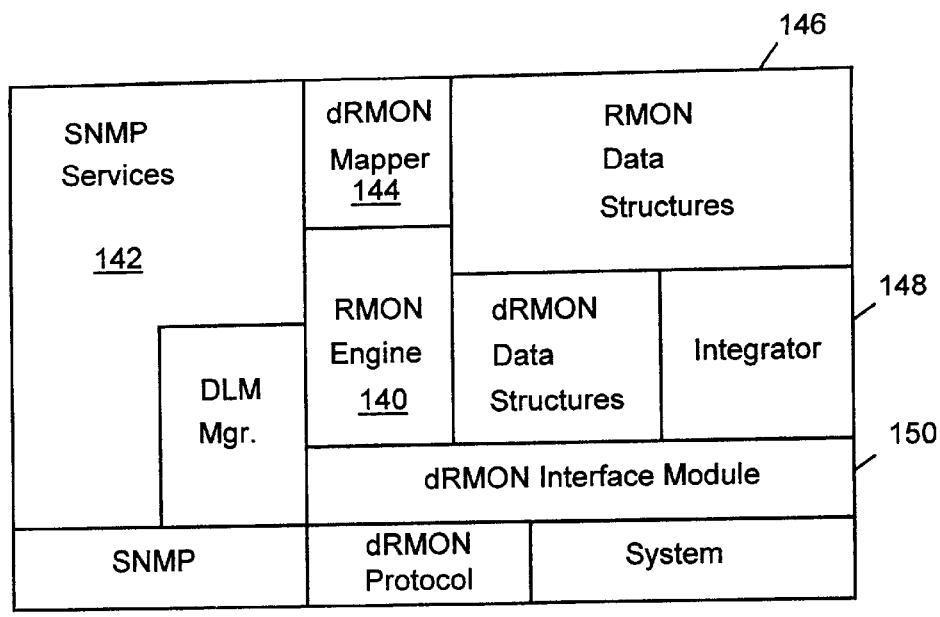
FIG. 7 is a more detailed internal view a of an embodiment of a dRMON Collector according to the invention.

FIG. 7 gives a more detailed internal view of the Collector executable. Again, the architecture is very similar to that of the dRMON Agent and may use a third-party RMON2 engine as RMON2 engine 140. The SNMP Services component 142 provides the RMON extensions that are registered with the Microsoft Extensible SNMP Agent. The dRMON Mapper 144 performs the task of mapping between RMON MIB objects and their internal representations contained within the module labeled RMON Data Structures 146.

The Integrator 148 merges RMON statistics, tables and capture streams coming from the remote dRMON agents with the equivalent output from the Collector's analysis of its own directed traffic combined with the broadcast and multicast traffic present at its interface. The final result is an integrated view of all of the monitored traffic just like one would get from a conventional RMON probe.

The other lower-layer components such as the dRMON Interface Module 150 provide the same platform isolation function that they do for the dRMON Agent thus permitting the other modules to be implemented in a way which maximizes their portability.

Protocol for Communications Between Adaptor and Collector

According to the invention, a protocol is defined for communications between a collector and its agents. The specific details of the protocol are not necessary for an understanding of the invention, and the protocol may be a prior art network management protocol, such as SNMP or a subset of standards-based SNMP.

However, the invention is also able to work with a simple and more efficient protocol for specifically communicating certain kinds of network management information and this represents a preferred embodiment. A preferred protocol would encompass both an application level protocol that handles MIB objects and a networking protocol that is powerful for the particular purposes for which it was designed. A preferred protocol does not require and is not susceptible to configuration by an ES user, so that it is not as easily inadvertently disabled by a user as many other network protocols are. A preferred protocol would bind more directly to a NIC driver so that the protocol will load and be functional even if other network protocol stacks do not load or are not operating properly. A preferred protocol will generally require no acknowledgement by default, but will include the ability to establish acknowledgements for reliability and also to include encryption features for security.

A preferred protocol may be restricted to communication between intermediate system collectors and end system agents, an area where users do not otherwise need to interface. The collector, in one embodiment, is designed to interface with other network management software through a standards based protocol, like SNMP, to facilitate interoperability with network management software.

A preferred protocol will result in lower network traffic, be very reliable and require a small installation on the end-systems. A preferred protocol will be designed with an awareness of the reliability of modern network infrastructures realizing that many prior art protocols are designed with the assumption that network traffic will be very unreliable and that packets will often get dropped or lost after they are transmitted. In modern networks, in fact, packets rarely get dropped once they are sent by the transmitter. A preferred protocol, therefore, eliminates much of the acknowledgement and redundant traffic generated by other network protocols that unnecessary for reliable network operation.

For the purposes of this description of the invention, we will refer to the protocol by which dRMON collectors and agents communicate over the network as the dRMON protocol. Unless the context otherwise requires, the dRMON protocol should be understood to represent any possible protocol between collectors and agents for the exchange of management/monitoring information, generally in the form of MIBs, including prior art SNMP-type protocols or including a preferred specialized protocol as just described.

Collector and Agent Functions

From the perspective of the user, the primary functions of the agents and the collector are to collectively implement the monitoring, management, and packet capture capabilities defined from RMON2, SNMP, and related networking standards with enhancements resulting from the distributed nature of the invention as herein described. As these primary functions are described in publicly available standards and documents and are well-know to practitioners in the art, details of the network statistics gathering, packet capture, or standards-based configuration of those function are not described here. What follows is a description of the functions according to the invention that allows the invention to perform network monitoring, in a distributed fashion.

Some collector functions will now be described. In addition to performing RMON2 analysis on its own directed traffic as well as all multicast and broadcast traffic the Collector performs several other functions pertain to the management or configuration of its remote agents. dRMON embodiments may be designed to interoperate with a variety of RMON Management applications and all major SNMP Management Platforms (e.g., HP OpenView) that support the original RMON MIBs. Doing so requires only that the collector be programmed to communicate with the particular management application and that filtering functions required by the management application be translatable by the collector to directives to the agent.

Agent Discovery by Collector

The collector is responsible for automatically discovering all of the dRMON Agents within its management sphere. According to one specific embodiment, a special multicast discovery frame is used to solicit identifying responses from the agents. Each agent sets a different response delay so as not to flood the Collector with discovery responses when a discovery request is broadcast. In one embodiment, this delay is set by each agent based on a random number. In other embodiments, as described below, response delay is based on some characteristic attached to each specific ES, such as MAC address. Discovery requests are repeated periodically to detect nodes which have been added or powered-up since the last discovery operation.

Time Synchronization and Polling

To facilitate proper time-based ordering of captured packets at the Collector and to ensure that statistics are placed into the proper time period buckets, statistics and packets coming from the Agents to the collector are time-stamped by the agents. In order to accomplish this time-stamp, each agent maintains a clock, derived from its system clock. To be meaningful, the clocks in each Agent must be kept fairly close to those of its peers and their Collector, although precise alignment is generally not possible and is not required by the invention.

In order to keep agent time-stamps aligned, the Collector sends out a time synchronization message periodically. These messages may also be used to trigger the return of statistics from the Agents. As elsewhere described herein, each Agent sets a random delay interval before sending its data to prevent flooding the collector.

In a specific embodiment, agents and Collectors keep time in 100-nanosecond increments, each individual agent and collector ultimately deriving its count from the CPU clock of its own host. The Collector includes in each poll, sent out every 5 seconds, its current uptime counter which is the number of 100-nanosecond increments that have occurred since the collector was started. Agents compare this value with their own count, computed from their own system clock, and compute any corrections that need to be made to account for variations in system hardware at each node. Agents use their own corrected counters to provide a relative time stamp on the statistics and captured packets that they return. In a specific embodiment, the agent and collector counters are each roll-over counters.

In one embodiment, average latencies in the path between the agent and the collector are ignored, because in most real-world local area networks, the transmission delay will be effectively zero. Other embodiments are possible where the agents compute average latencies and adjust their time-stamps accordingly.

During packet capture, the collector time-sorts captured packets returned to it to ensure that protocol exchanges are ordered correctly in the capture channels. The timestamps added by the agents will normally be sufficient to do this, but at times, because of corrections made at the agents, some captured packets may get returned with nearly identical time-stamps. In that case, the collector uses some protocol interpretation (such as sequence numbers, or request/response indications) to correctly order the captured packets.

Agent Management by Collector

Agent Management can be roughly divided into two areas: agent configuration and RMON configuration.

Agent configuration refers to such issues as how much memory/storage for the agent to reserve for RMON data space, version management, etc. These actions are not defined in prior art RMON and are accomplished using dRMON protocol management frames.

RMON configuration consists of filter settings, historical sampling intervals and other RMON MIB-defined user-settable options as well as the newly accepted Aspen MIB for standards-based probe configuration. dRMON protocol frames are used to carry these exchanges but within them are SNMP-formatted PDUs carrying the actual management information.

Optimization of Network Traffic by Agents and Collectors

According to the invention, network traffic between agents and Collector is designed to be "finite", i.e., in as many cases as possible, agents and collectors communicate using a minimum number of packets. The following steps are taken by the invention to help optimize and minimize network traffic between the collector and the agent:

1. For discovery, reporting of statistics, and time synchronization, the collector generates a multicast poll to which each of the agents replies. If a multicast poll is dropped at any agent, no retransmission or acknowledgement is attempted. This is possible because according to the invention, traffic information reported by the agents to the collector is in the form of cumulative counters; if a report packet from an agent is dropped or is missed by the collector, a subsequent report packet from the agent will correct the statistics at the Collector.

2. Conversation traffic information sent by the agents is time-filtered, i.e., only the conversation entries that were updated since the last retrieval by this collector are sent by the agent.

3. Traffic information sent by the agents to the Collector in the response is complete within one packet; no response depends on the availability or arrival of a second packet from the agent, so responses can be processed immediately. Even if certain response packets get lost, impact to overall accuracy of collector statistics is minimal.

4. Agents generate a statistics response packet only in response to a request by a collector. In general, there is no other traffic generated by agents unless specifically requested by the collector in a multicast packet.

Distribution of Packet-Capture Among dRMON Agents

According to the invention, the agent and collector can also perform capture of specific packet streams, as defined by RMON for stand alone RMON probes. To accomplish packet-capture, an RMON-management application sets up the proper filters, channel and buffer control parameters at the Collector, as described in standard RMON MIBs, and as would be done in a standard RMON probe. All new filter definitions, channel definitions, and buffer control definitions are then forwarded by the collector to all dRMON Agents using multicast packets, as soon as these definitions are set up at the Collector. In addition, the collector may communicate existing definitions periodically to all dRMON agents.

Based on these definitions, dRMON agents capture packets and forward them to the collector. Each dRMON agent captured packets only in non-multicast conversations in which it is an active member. If the conversation is with a non-agent ES, then the agent node is responsible for the capture. If the conversation is with another dRMON agent, then in one embodiment to maintain the time order of captured packets (i.e., the response is after the request, etc.), only one of the two agents in a conversation captures the packets and is responsible for sending these packets to the Collector. In one embodiment, if both sides of a conversation contain an active agent, a simple comparison of MAC Addresses is made and a MAC Address which is lexicographically bigger becomes responsible for capture. Other rules for determining priority for packet capture are possible. In general, if only one side of a conversation has an active agent, that side captures packets for both sides.

In some embodiments, in some situations, both sides of a conversation will be reporting captured packets. Where necessary, the periodic synchronizing timebase messages from the Collector are used to keep the dRMON Agent's packet timestamps in close alignment and protocol analysis is used by the Collector, as needed, to supplement the use of the timestamps in recreating correct time order of the captured packets.

In one embodiment, captured packets within a poll-interval are grouped and sent to the Collector on the subsequent multicast request. This frees up memory and system resources at the agent for more packet-captures ahead.

In one embodiment, the invention does not protect against loss of captured packets once those packets are transmitted from an ES. If, for some reason, a packet cannot be received at a node, the captured packets it contains will be lost. However, other elements of the invention as described herein, reduce the dangers that a collector will not receive a packet once it has been transmitted by a node. In an alternative embodiment, an acknowledgement based protocol connection is established when captured packets are to be transmitted.

Coverage of End-Systems without dRMON Agents and Duplicate Data Filtering

According to one embodiment of the invention, provisions are made for ESs with dRMON agents installed to gather statistics or capture packets pertaining to other ES which do not have active dRMON agents. In this way, the invention may be effectively employed in a network even where all ES are not equipped with dRMON agents. In this embodiment, the collector and agents work together to eliminate duplicate statistics information reported to the collector by various agents and to reduce unnecessary network traffic overhead. To avoid both of these problems, according to this embodiment, the collector maintains a list of identifiers of ESs with active dRMON agents. In one embodiment, this list consists of the MAC (layer 2) addresses of the ESs with agents. This list is communicated to every dRMON agent controlled by the collector piece-by-piece, with a certain number (N) of ES indications notified to all agents in each multicast request. Agents capture and use this information to reduce unnecessary traffic as described herein. The information may be contained within the agent ES in any type of table structure and in one embodiment the information is stored in a binary tree table in order to facilitate quick look-up at the agent of received ES addresses to determine whether or not this agent will capture that received traffic.

Agents and the collector follow certain rules to reduce network traffic overhead. In general, agents report statistics regarding only conversations that are (1) directed (i.e. not multicast), and are (2) to them (i.e. received (Rx) traffic). For transmitted traffic, the agent reports statistics for directed traffic only when the receiving ES does not have an active dRMON agent according to the reporting agent's list. Other rules are possible that eliminate duplicate reporting.

In cases where for some reason an agent incorrectly reports transmitted traffic to another active agent, the collector can eliminate duplicate reports by giving higher priority to reports from the agent at which the traffic was received.

Therefore, if agents A and B both report traffic between them, a collector will use part of the traffic information from A in which traffic is directed to A and part of the traffic information from B in which traffic is directed to B. Another example, in which A is an agent ES and Z is not, conversation between them will be reported by A only, and there is no duplication to be avoided.

According to specific embodiments of the invention, a number of other strategies may be used to prevent transmitting duplicate data to the collector or, when duplicate data is transmitted, to prevent that duplicated data from being counted twice at the collector. These strategies can vary based on whether the data is captured packet data streams forwarded to the collector or is RMON statistics only sent from the agent to the collector.

Furthermore, to prevent duplication of multicast and broadcast statistics, in one embodiment only the Collector itself tracks multicast and broadcast packets and ES agent tracking is disabled for those packets. Agents do not report any traffic statistics based on broadcasts. Currently, multicast traffic is also handled by Collector only. In some alternative embodiments, it may be desirable to have agents participate in reporting of multicast traffic.

Preventing Flooding of Collector

According to the invention, the collector sends out a multicast request to all its agents every polling interval. If all the agents respond to this request immediately, or with a similar delay, there is a chance of flooding the Collector with more packets than it can receive and process. The collector in turn may have to drop some packets depending on the buffer-resources available. To avoid that, each agent uses a delay algorithm, which calculates amount of time to wait before sending the response. Ideally, this delay algorithm is such to spread responses from the agents as evenly as possible over a poll response period so that the collector can more easily handle all response packets. In one embodiment, an agent derives a delay value from its unique MAC address of the ES to distribute response packets across the desired response time. In another embodiment, an agent uses a random number generator, seeded with the unique MAC address of the ES, to distribute response packets across the desired response time. In other embodiments, agents seed a random number generator with two numbers, one based on a changing value such as a system clock. This redistributes responses from ESs during each response time. Other response distribution algorithms are possible that distribute agent responses, including deterministic algorithms based on the number of agents responding to a given collector.

Aging out of Agents and Collector

Agents age-out collectors when the agent no longer receives any multicast requests for a prolonged period. When an agent ages out all collectors, the agent can free up the ES resources no longer needed, and also it no longer needs to process every single packet because there is no one to whom it can send packet statistics. Only the dRMON protocol packets need to be processed by dormant agents in order to check for the presence of a new or reawakened collector on the network.

The collector also times-out an agent if it does not receive a response to a series of multicast polls for a prolonged period. In addition to freeing up resources in the collector that are no longer needed, this information (i.e., that this particular ES is no longer a dRMON agent) is communicated to other agents. Other agents can then start reporting for this new non-agent, as explained elsewhere in the application.

According to one embodiment, there is very little memory requirement (less than 10K bytes) for the agent until it sees a collector packet, at which time the RMON engine is initialized and a number of buffers are allocated.

Compatibility and Interoperability

According to the present invention, collectors and agents may be designed to operate effectively with a number of different network interface cards (NICs) and NOS architectures and a number of different management applications. The separability of the agent and collectors allow the management system according to the invention to be adapted to different operating environments while localizing the interoperability design issues to the module (agent or collector) necessary for interface with that system.

Specific Adapter/Network Operating System (NOS) Support by Agent

The first release of one specific embodiment of the invention includes support for NDIS 3.X which encompasses Windows for Workgroups 3.11, Windows 95 and Windows NT 3.51 or later. Novell's Client 32 will be supported in these same environments via the NDIS 3 wrapper which will still be present. Any vendor's NIC which offers an NDIS 3.X compliant driver can and will be supported, although NIC drivers designed for use with the invention may be enhanced to provide additional features.

All Microsoft-defined Physical Media Management OIDs (object I.D.) will be implemented including those categorized as optional. This allows dRMON agents to detect all media-based error events when running on adapters and drivers designed for use with dRMON.

Transmit Callback

A special Transmit Callback from the dRMON Agent is supported in drivers designed for use with the invention. This transmit callback allows outbound traffic from the host to be monitored by dRMON without the performance penalty resulting from putting the adapter in promiscuous mode, as is currently required in many prior art drivers in order to see transmit traffic. In some current network operating systems there is no way for a higher layer protocol (such as the dRMON agent) to signal to the driver that it wants to see copies of data that is being transmitted on the network.

According to the invention, the dRMON agent performs a set operation against the NIC driver using the transmit callback OID, indicating a 32-bit pointer to the dRMON agent's call-back routine. If that operation succeeds, then the dRMON agent knows that the NIC driver includes code to support the transmit callback. The agent then can instruct the NIC driver, using set operations, to set NIC driver filters to monitor directed transmit traffic. If the callback set operation fails, then the agent sets the adaptor filters to promiscuous mode, in which case the adaptor reads all packets that appear on the wire, including packets it transmits, and those packets are available to higher layer protocols.

This alternative aspect of the invention is necessary because in Microsoft's original NDIS architecture, an adaptor NIC driver communicating through the NDIS wrapper does not have the ability to pass transmitted packets back up to a different higher layer protocol than the protocol that originated the packets. Therefore, in a prior art NDIS NIC, the agent cannot get access to packets transmitted by other higher layer protocol.

The NDIS wrapper does, however, give a driver the ability to hold a packet in buffer memory until the driver has determined from the adaptor card that the packet has been copied to the card and sent. According to this aspect of the invention, a driver takes advantage of this mechanism to communicate directly with an dRMON agent DTA TDI that a transmitted packet in the buffer and can wait until the TDI has read and analyzed the packet before signalling to the NDIS wrapper that processing on the packet is complete.

Security

Communication between a dRMON agent and Collector is secure. Before either an agent or a Collector is installed, the user sets a password that one collector and all agents with which it is communicating use to encrypt all messages between them. The password is separately encrypted by each agent and by the collector and an embedded key is stored in each image (executable) file of the dRMON Agents and the Collector. According to the invention, the agent and the collector each use a slightly different algorithm that produce different embedded keys from the password, though the two algorithms are guaranteed to always be able to reproduce the same password at when they are run. This mechanism is employed so that a "hacker" can not simply do a comparison of a dRMON collector and agent executable files in order to derive the embedded key. The invention protects against a hacker from simply diffing the executable files to locate the password and then inserting that in a "rogue" Collector executable.

In some types of networks, those configured to be one large LAN, several collectors may be deployed to handle all the agents in the LAN and each collector will collect statistics from one group of ESs on the LAN. Communication between the ES and its collector is controlled by the shared password because agents will not correctly be able to decode and will simply ignore poll packets that do not use the password set for themselves and their collector.

In one embodiment, the dRMON agents have two passwords, one a dRMON-and-auto-update password, the other an auto-update-only password (also referred to as a back door key). Both of these are stored within the dRMON agent in an intermediate, encrypted form.

At run time, the dRMON agent and the Collector, using slightly different algorithms, calculate a final password key from their stored intermediate password. This derived value will be the same at both ends (both the collector and the agent) and will be kept in run-time memory only and never stored anywhere the user might hack. This Collector's calculated key is carried in the Authentication field (also 16 bytes long) of the dRMON protocol Common Header. Once the key is placed on the network, some type of network encrypting, such as MD5, is used to protect the security of the packets on the network.

Figure 9:
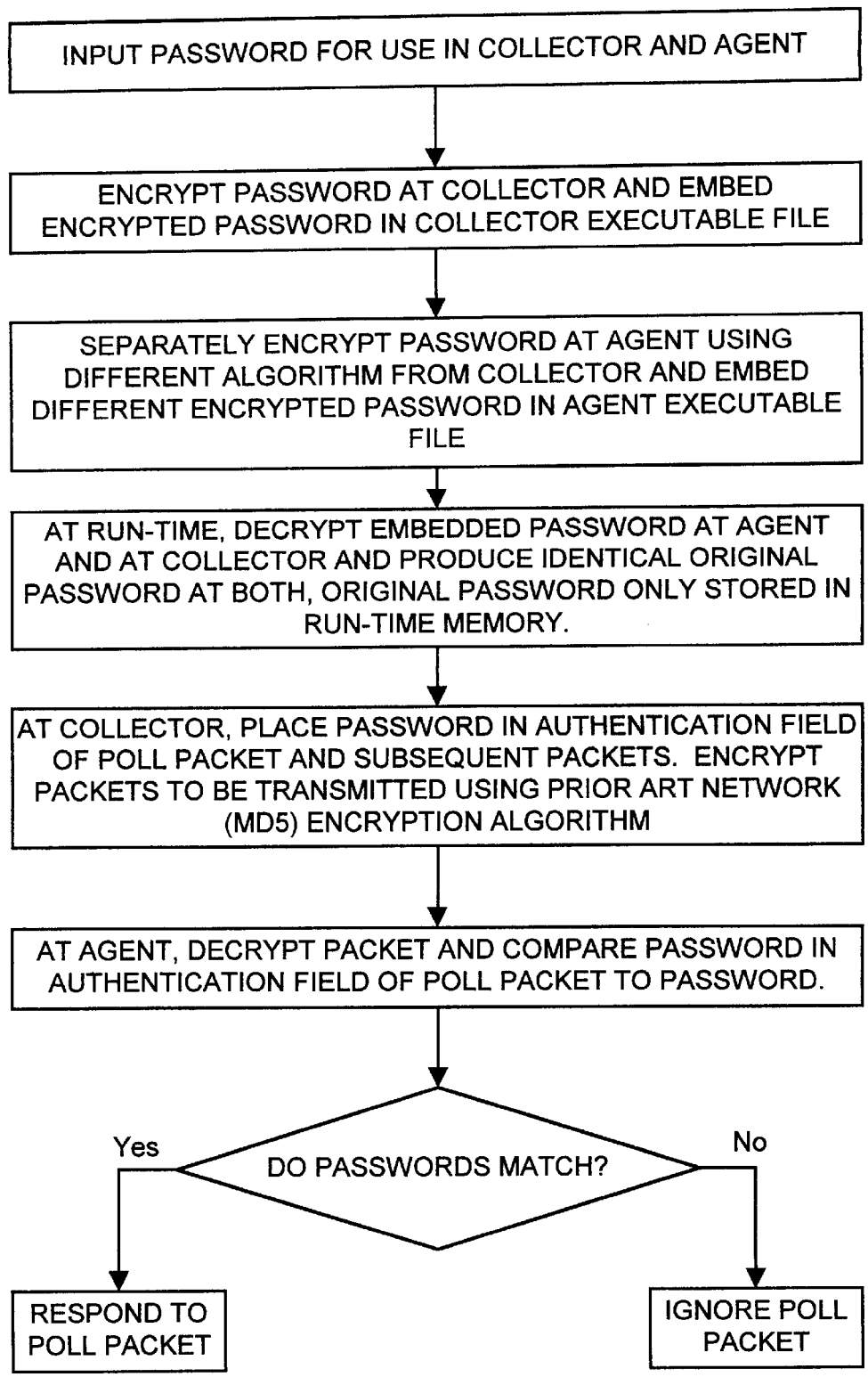
FIG. 9 is a flow chart illustrating a security mechanism according to an embodiment of the invention.

If the Collector's final calculated key does not match either of the dRMON agents' keys (normal or backdoor keys), the dRMON agents will reject its request. If this key matches the back-door-key, then auto-update will be allowed. If this key matches with dRMON agent's key, then auto-update as well as other dRMON information is provided to it. FIG. 9 provides a flow chart of one embodiment of a security feature according to the invention.

In one embodiment, once an agent has validated a collector it stores an indication for an address of the collector and does not have to validate subsequent packets received from the collector.

Other embodiments are possible that use security features provided by the network operation system and that therefore do not require a user to set a password. In such embodiments, a different, but possibly related mechanism may be used to allow multiple collectors to be heard by only a subset of agents.

Thus, the invention provides a number of alternative security measures that together provide secure communication between agents and collectors.

Efficient Reporting of dRMON Data over a Network

Prior art RMON probes typically communicate information about the network's operation with a management station using RMON defined MIBs and filters that are individually reported to the management station upon request of individual MIB data. Prior art RMON defines a number of different counters, each of which an RMON probe can report to a management station upon query by that station through SNMP or another generic network management protocol. This can potentially lead to a large amount of traffic flowing between a prior art probe and a management station in order to display an overall picture of the network.

The present invention in one embodiment reduces this traffic by having a collector continuously update one or a group of simple files at the collector that contained data representing the compiled statistics of network operation. These file may be stored as simple text file. A management station or a display terminal enabled to receive and display this data can then make one request for a compiled file then and use the data in the file to display a representation of network operations. A dRMON collector, according to an embodiment of the invention, may also include an SNMP interface allowing it to report individual counter values as is done is prior art interfaces. One application for this embodiment would be to make the data available over an internet type network, and displayable by a web browser.

FIG. 10 shows a representation of an example of one simplified data file that may be used to report statistics according to the invention. The first line, "ipcount", identifies whether the data has changed. "Pktdist," "pktrate," "stats," are keywords that preceed data lines for a particular class of data. In this example, data in quotes is treated as labels and floating point numbers are treated as values.

Hierarchical Collectors

Multiple alternative deployments of dRMON collectors are possible according to the invention, with different embodiments including different sets of the features described herein.

In addition to distributing the data collection process, the data archiving and retrieval process may also be distributed. Today's management systems traditionally have focused on a centralized management console model where all the data ultimately lives at one management station such as 54 after having been retrieved from its remote sources. The obvious and significant disadvantage to this is that the information is unavailable to a network manager who is physically located elsewhere.

Most larger networks already have various information sources already deployed at some locations such as RMON probes, embedded RMON implementations (often partial group support) or embedded SNMP Agents. It is advantageous to incorporate their input into the dRMON view, supplementing it when possible with more complete management data.

An enhanced collector provides sophisticated management capabilities that are too difficult or costly to routinely include in the standard collector, especially when the Collector is embedded in a hub, switch, or router. Such enhanced capabilities might include WEB support with JAVA server capability, the ability to feed management data into standard databases or intelligent analysis of management data to spot problems before those problems become critical.

Figure 8:
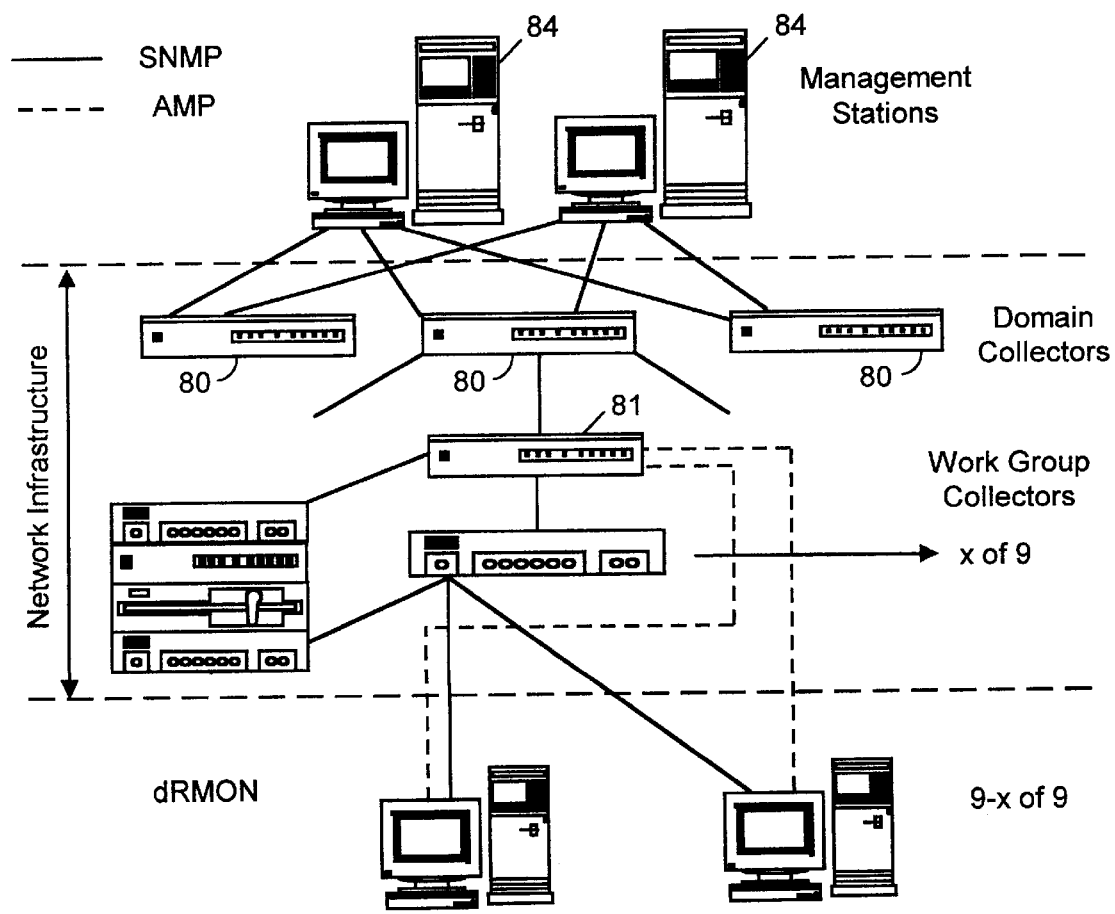
FIG. 8 is a diagram illustrating hierarchical collectors according to an embodiment of the invention.

FIG. 8 illustrates how this concept may be implemented according to an embodiment of the invention and how it may be distributed within the networking environment. Two classes of Collectors are depicted: Workgroup Collectors 81 and Domain Collectors 80. All collectors are addressable by Management stations 84, but often only Domain Collectors are in fact addressed by a management application.

Workgroup Collectors oversee smaller regions of the network such as a single floor in a multilevel building. Because their sphere of management is smaller, a workgroup collectors' physical requirements (CPU power, memory, etc.) are also smaller; as a result, they can often be embedded in switch or hub. In smaller networks, these Collectors would probably be adequate for their management needs and a second tier of Domain Collectors would not be required.

Domain Collectors (DCs) are used in larger networks to collect and archive management data from Workgroup Collectors within their sphere of management. DCs typically represent larger regions within the enterprise network such as a remote office or a whole building on a large campus. Each one can support multiple management stations 84, thus permitting any manager to monitor that domain from anywhere in the enterprise. Because of their greater scope of responsibility and the need to provide considerable long term and nonvolatile data storage, DCs are generally much more powerful devices than Workgroup Collectors and as such, are generally implemented as stand alone stackable devices generally located with the switches and hubs they oversee.

A more detailed description of these Collector types and various alternative embodiments follow.

Workqroup Collectors

A Workgroup class dRMON Collector is located in a prior art type RMON probe, a hub/switch, or a stackable dedicated device. There are advantages and disadvantages to each of these hardware implementations as discussed below.

(1) Probe Based. RMON probes often have more resources available than do management cards embedded in switches and hubs and are often strategically located throughout the network in a way that makes them prime candidates for collection points for dRMON. Combined with a desire to monitor devices which do not have a dRMON agent installed, locating a Collector in the probe has further advantages. For example, a dual-interface RMON probe could be connected to two switch ports which are shared with a number of older PCs, Mackintoshes and UNIX workstations which do not have dRMON Agents. All other dRMON-equipped nodes would be distributed across the other switch ports. Ideally, the probe would be configurable to provide a choice of views such that the user could select to have the probe combine the Collector's data with its own to create one interface view or to present them as separate interfaces.

(2) Hub/Switch Based. Most Hubs or Switches are offered in manageable versions including management functions, so it is a natural option to place a dRMON Collector within them. The primary disadvantages to this approach are that management cards are often resource constrained both in available CPU power as well as in RAM capacity, with the RAM limitations often enough to preclude doing much in the way of packet capture and store, and that to one degree or another, the inclusion of RMON analysis in the switch usually negatively affects overall switch performance. Nevertheless, many users may prefer this approach and it enables an RMON solution for products that do not have the resources to support full embedded RMON.

(3) Stackable/Stand alone. The Stackable Collector is a dedicated dRMON Collector whose packaging may be identical to that of the stackable hubs which it would manage. It may be based upon proprietary hardware or possibly a PC without monitor or keyboard. This Collector has a more powerful CPU than most embedded management cards and is capable of holding considerable RAM and, optionally, hard disk storage; as a result, it can hold much more RMON data such as large amounts of historical data or captured packets. It may also provide additional services such as WEB-based RMON management and even WEB-based device management of the rest of the stack. The inclusion of many of these enhanced capabilities into this Collector's specifications are facilitated by basing it upon the PC architecture and using an OS such as Windows NT to support various add-ons. The development tools for the PC platform are also far ahead of those for embedded processors, thus shortening substantially the time-to-market and maximizing the availability of experienced programmers.

Domain Collectors

While dRMON Agents distribute RMON's functionality on the front-end (i.e. at the ES level), it is Domain Collectors 80 which distribute it on the back-end (i.e. at the management terminal level). DCs are generally implemented on powerful hardware, possibly based upon Pentium/Pentium Pro systems running Windows NT. DCs are concentrators for large amounts of network management data. In one embodiment, DCs allow capturing more network monitoring data without overly burdening distributed collectors by periodically off-loading statistics from the ISs, freeing up those IS resources to continue to capture new data. This data is gathered from a variety of possible sources, such as: dRMON Workgroup Collectors, Embedded RMON (full or partial) in switches/hubs, RMON probes and/or Embedded SNMP Management Agents in switches/hubs. A DC merges and organizes this various information to create a seemingly homogenous view of its management domain. The management domain may include different LANs that communicate across routers and domain collectors generally are able to communicate via a routed network protocol, such as IP. The merged view is then made accessible in any variety of possibly ways, including to compliant SNMP-based management applications, published using WEB protocols, via dial-up, etc. Because of the large and extensible storage capabilities that may be included with DCs, considerable historical data and many large captured packet streams could be maintained and archived and offered to any management station anywhere in the enterprise.

Other features that may be included in alternative embodiments of DCs or in higher performance collectors include:

Data sourcing for popular database products. ODBC in this embodiment are used to cull important management data from the domain view and feed it to databases created and maintained by the user. This capability allows users to use the database query and reporting tools they use every day to also access and analyze their network management data.

WEB-based device management. The Domain Collector may provide a WEB front-end to the SNMP device management thus making any browser-equipped station a device management station.

Expert Analysis. One of RMON's greatest strengths is its filter and capture capabilities. However, unless the user is a protocol expert, most of the power of this feature is lost to them. Expert systems tools, like those now appearing for Windows NT, may be used in this embodiment to provide ongoing analysis of the management data and alert the user to problems before they become critical and can suggest possible resolutions.

Systems Management Integration. At present, management tools vendors have lined up on opposite sides of the fence: there are those who focus on systems management tools and those who have concentrated efforts on network management. Unfortunately, many of the real world problems users face are not cleanly isolated to one side or the other. There are numerous systems management tools such as LANDesk and Microsoft's SMS which could be coupled into a DC via interfacing software. In combination with expert analysis, DCs could then provide problem detection and resolution of many common problems regardless of whether they were system problems, network problems or a combination of the two.

The invention may be embodied in a set of executable computer program code which may be stored into a fixed computer medium such as a disk, diskette, volatile memory or non-volatile memory, or any other medium for storing computer code. In such a case when such instructions are loaded and executed in an appropriately configured network intermediate system, the intermediate system will perform as described herein. A representation of such a system 700 in shown in FIG. 11, containing CPU 707, optional input devices 709 and 711, disk drives 715 and optional monitor 705. Fixed media 717 may be used to program such a system and could represent a disk-type optical or magnetic media or a memory. A system such as 700 may be used in conjunction with the invention as embodied on a fixed media to generate executable files that can be distributed throughout a network to various network components as described herein.

The invention has now been explained with reference to specific embodiments. Other embodiments will be apparent to those of skill in the art. In particular, method steps have been grouped and labelled as being part of various sub-methods in order to increase clarity of the disclosure, however, these steps could be differently grouped without changing the essential operation of the invention. Furthermore, it should be understood that while the invention has been described in terms of a computer network, the invention has applications in a variety of communication systems, such as advanced cable television or telephone networks, or any other communication system including system performance monitoring at distributed points in the system and reported back to a centralized collector. It is therefore not intended that this invention be limited, except as indicated by the appended claims. It is also intended that the word "network" as used in the specification and claims be read to cover any communication system unless the context requires otherwise and likewise "end system" be read to encompass any suitable end system (telephone, television) on any such communication system or to encompass distributed points in the network intermediate of an end systems. It is also intended that the word "packet" as used in the specification and claims be read to cover any unit of transmitted data, whether an ethernet packet, a cell, or any other data unit transmitted on a network unless the context requires otherwise.

What is claimed is:

1. A method for distributed collecting of network statistics comprising:
    gathering network statistics at a plurality of nodes distributed in a network;
    transmitting data containing said statistics to a collector;
    combining said statistics from said plurality of nodes into group network statistics to form complied statistics;
    reporting network performance data based on said compiled statistics, from said collector, to a network manager; and
    wherein multiple nodes each respond to a multicast poll data unit from a collector and flooding of the collector is prevented by having each node delay its response by a random value.

2. The method according to claim 1 further comprising:
    setting values at said collector to configure said collecting of network statistics; and
    forwarding configuration data by said collector to said nodes to configure said gathering by said nodes.

3. The method according to claim 1 further comprising:
    launching an agent in nodes participating in said distributing collecting, said agent being an executable module for gathering network statistics and communicating with said collector.

4. The method according to claim 1 wherein said compiled statistics are as defined in a standard defined for the gathering of network-wide performance statistics.

5. The method according to claim 1 further comprising:
    capturing network data streams at said nodes; and
    forwarding said captured data streams to said collector.

6. The method according to claim 4 wherein said compiled statistics are as defined by published RMON or RMON2 monitoring protocols.

7. The method according to claim 1 wherein a plurality of said nodes are end systems that provide network communications to a user.

8. The method according to claim 1 wherein a plurality of said nodes communicate using an ethernet protocol.

9. The method according to claim 1 wherein said collector communicates with said network manager using a first protocol, said first protocol being a higher layer protocol defined for the monitoring and management of networks and wherein said node communicates with said collector using a second protocol, said second protocol being a lower layer protocol that in unacknowledged and is specifically designed for lower layer network management communication.

10. The method according to claim 1 wherein said collector and said nodes communicate via a protocol in which:
    statistics data from nodes to the collector is generated only in response to a poll packet received from a collector;
    poll and response packets are not acknowledged or retransmitted;
    nodes report all network statistics in terms of cumulative counters so that any failure of any poll or response packet does not result in erroneous data at the collector but merely results in a delay in the collector receiving the data.

11. The method according to claim 10 wherein said protocol further provides that node responses to a poll from a collector are complete in one data unit so that a received response from a node can be processed without depending that any other data unit be received.

12. The method according to claim 1 wherein said multiple nodes each respond to said multicast poll data unit from said collector and flooding of the collector is prevented by having each node delay its response by said random value, wherein said random value determined at each node and derived from an address of said node.

13. The method according to claim 1 wherein said multiple nodes each repeatedly respond to repeated multicast poll data units from said collector and flooding of the collector is prevented by having each node delay its response by said random value, wherein said random value determined at each node and derived from an address of said node and a changing value such that responses to a multicast poll data unit are redistributed with each poll.

14. The method according to claim 1 wherein a node and a collector each have embedded within them an identical password that is separately encrypted by different reversible algorithms and wherein said collector and said node unencrypt their identical passwords at run-time only said wherein said collector places said identical password in an initial poll data unit and wherein said node responds to that collector only if a password in a poll data unit matches its password.

15. The method according to claim 9 wherein said first protocol is a standard-based SNMP protocol allowing said collector to communicate with standard network management applications and said second protocol is a non-routed layer 2 protocol optimized for unacknowledged communication between a collector and a node.

16. The method according to claim 1 wherein said collector is a set of functions embedded within a network intermediate system.

17. The method according to claim 3 wherein said agent is a set of functions incorporated in other driver or system software installed in a node.

18. The method according to claim 1 further comprising:
transmitting data containing compiled statistics from said collector to a domain collector;
compiling statistics from a plurality of collectors at said domain collector; and
providing reports based on said compiled statistics, from said domain collector, to a network manager.

19. A method for distributed capture of data unit streams comprising:
capturing data units at a plurality of nodes distributed in a network;
encapsulating said captured units and transmitting said encapsulated data to a collector;
combining said captured units from said nodes into group capture channels;
reporting said group capture channels, from said collector, to a network manager; and
transmitting at periodic intervals from said collector to said nodes a synchronization data unit, said synchronization data unit representing an elapsed time at said collector;
using said synchronization data at said nodes to maintain a time at said nodes that is in synchronization with the time at said collector;
and time-stamping captured data at said nodes when said data is transmitted from said nodes; said time-stamp representing an elapsed time at said node from when said data is received at said and when said encapsulated data is transmitted to said collector;
examining said time-stamp at said collector to determine and order said captured data units.

20. The method according to claim 19 further comprising:
setting values at said collector to configure capture channels for said data;
forwarding configuration data by said collector to said nodes to establish capture channels and filtering definitions; and
at said node, establishing capture channels resident on said node for storing said captured data units prior to encapsulating and transmitting said units to said collector.

21. The method according to claim 19 further comprising:
launching an agent in nodes participating in said distributed capture, said agent being an executable module for establishing capture channels, capturing packets, and communicating with said collector.

22. The method according to claim 19 wherein a plurality of said nodes are end systems that provide network communications to a user.

23. The method according to claim 19 wherein said collector communicates with said network manager using a first protocol, said first protocol being a higher layer protocol defined for the monitoring and management of networks and wherein said node communicates with said collector using a second protocol, said second protocol being a lower layer protocol that is flexibly either unacknowledged or acknowledged, has low overhead, and is specifically designed for lower layer network management communication.

24. The method according to claim 19 wherein said collector furthers examines a time stamp for captured data units and, where necessary, examines other protocol information in said data units to determine a correct order for said data units.

25. The method according to claim 19 wherein a node records the identity of all other nodes capable of performing distributed capture and only captures data if:
the data traffic is directed data traffic either to or from that one node; and if the other node is either not capable of performing data capture or if the address of the other node indicates that said node is designated to perform packet capture.

26. The method according to claim 19 wherein a node transmits encapsulated data only in response to a poll signal from a collector.

* * * * *